Figure 1:
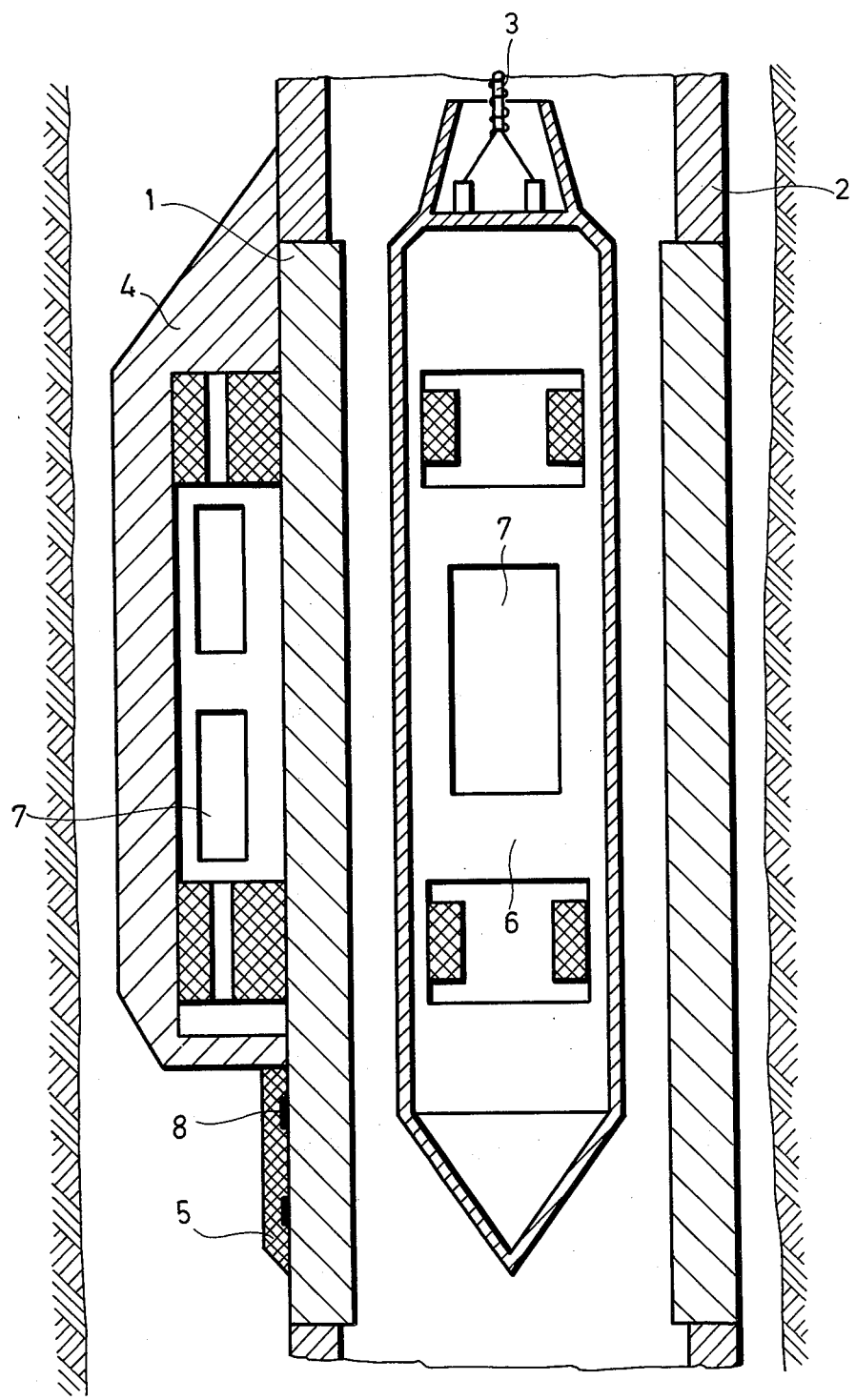

United States Patent [19]

Arpasi et al.

[11] 4,328,704
[45] May 11, 1982

[54] APPARATUS FOR MEASURING THE DEFORMATION AND STRESS CONDITION OF THE STRING OF CASING OF DRILLED OIL WELLS

[75] Inventors: Miklós Árpási; Géza Rákár, both of Budapest, Hungary

[73] Assignee: Országos Köolaj és Gázipari Tröszt, Budapest, Hungary

[21] Appl. No.: 120,632

[22] Filed: Feb. 11, 1980

[51] Int. Cl.³ .............................................. E21B 47/00
[52] U.S. Cl. ...................................................... 73/151
[58] Field of Search .................... 73/151, 152, 141 R, 73/774; 175/40, 50; 340/856, 857

[56] References Cited

U.S. PATENT DOCUMENTS

| | | | |
|---|---|---|---|
| 2,183,078 | 12/1939 | Kemler | 73/774 |
| 3,115,774 | 12/1963 | Kolb | 73/151 |
| 3,968,473 | 7/1976 | Patton et al. | 175/50 X |
| 3,974,690 | 8/1976 | Brock, Jr. et al. | 73/151 |
| 4,136,327 | 1/1979 | Flanders et al. | 340/856 |
| 4,202,490 | 5/1980 | Gunkel et al. | 73/151 X |

*Primary Examiner*—Jerry W. Myracle

[57] ABSTRACT

An apparatus for the in situ measurement of the deformation and stress conditions of a string of casings in a drilled oil well is provided with an antimagnetic measuring section mountable in the string of casings at a selected depth and having extensometers fixed on the mantle thereof and a first electronic unit. The unit includes printed circuitry mounted on the measuring section and receptive of the signals from the extensometers for transmitting same. The apparatus also includes a drill hole probe extendable into the interior of the casings to the depth of the measuring section and a second electronic circuit receptive of the transmission from the first electronic circuit to apply same to a cable attached thereto for processing at the surface.

2 Claims, 1 Drawing Figure

U.S. Patent     May 11, 1982     4,328,704

APPARATUS FOR MEASURING THE DEFORMATION AND STRESS CONDITION OF THE STRING OF CASING OF DRILLED OIL WELLS

The invention relates to an apparatus for measuring the deformation and stress condition of the string of casings of drilled oil wells.

Fundamentally two loads act on the string of casings built into the drill holes, i.e. the tensile load and the external and internal differential pressures. As a result of these two loads a complex deformation and stress condition is brought about.

When the string of casings is dimensioned in respect of strength, actually a comparison of the stress condition with the strength parameters of the casing pipes is conducted. Its purpose is to assemble a string of casing suitable in respect of strength and carrying the assumed loads with safety.

Determination of the load acting on the string of casings and the resultant stress condition is based on uncertain conditions. Its main reason is found in the fact, that the string of casings passes into such physical medium—the earth's crust—the parameters and properties of which are unknown, or may be approached only with great uncertainty. For this reason determination of the stress condition of casing pipes is uncertain, the strength dimensioning is partly assumed and partly based on schematized loads.

The actual deformation and stress condition of the string of casings can be directly and most obviously determined with on the spot measurement. The stress condition may be measured on the ground surface, or in its immediate vicinity, but it may take place in the drill hole even at great depth.

For in-depth measurement of the loads acting on the string of casings, or the resultant stress condition such measuring instrument was developed in Krasnodar of the Soviet Union, by which the external pressure acting on the string of casings is measured. A magnoelastic measuring signal converter is used for the measuring. The instrument unit containing the magnetoelastic sensor and electrical converter is fixed to the external surface of the string of casings, that is connected with the surface by a cable leading through the annular space and fastened externally to the string of casings. The electric power is supplied for the instrument unit in the depth and transmission of the measured signals to the surface through the cable. This measuring system is described by the publications "Magnitoupruguj datcsik davlenija avtorszkie szvidetelsztve" (p. 113, Copy No. 32, 1972), furthermore "Metodika izmerenije davlenija i temperaturn v zacementirovamroj cseszti zakolonnogo prosztransztve szkvazsinu sz apparaturoj ZIO-I, Krasznodar, 1975", as well as "Datcsik dija izmerenija uszilij avtorszkie szvidetelsztva" published on p. 107, journal No. 29, 1969. The system is defended in the Soviet Union by patent No. 252 682.

A disadvantage of this measuring system is that owing to the cable externally fastened to the string of casings, the depth of laying is restricted, it may be maximum 1000 m according to the experiences so far, furthermore any breakdown of the cable stops the measuring possibility and neither the instrument unit in the depth nor the cable can be repaired.

Such solution is also familiar, according to which a dynamometer cell is used as a signal converter for measuring the external pressure acting on the string of casings. This dynamometer cell is fastened to the external surface of the string of casings in the depth of the measurement. A cable fastened to the external surface of the casing pipes is used for transmission of the measured signals to the surface. This solution is described in the October copy 1974 of "Journal of Petroleum Technology" on pp. 1159-1160 (T. K. Perkins and J. A. Rochon) titled: "Studies of pressures generated upon refreezing of thawed permafrost around a well bore". With this measuring system the pressures acting on the string of casings were measured down to a depth of maximum 800 meters when drilling through polar permafrost rocks. For measuring of the external pressures such conceptual solution is known (Izmajlov, L. B., Abramova, A. A., Szeszpalov, V. V., Dualov, V. H.: "Usztrojsztva dlja izmerenija vnesnego davlenija ne obszednuja kolonnu". Technika i technologija promüki i kreplenija szkvazein, Krasznodar, 1976, pp. 114-118), according to which the external pressure is measured with a magnetoelastic signal converter, the electrical signals are transmitted to the cable-fitted probe in the interior of the string of casing through the antimagnetic tube, from where the signals are transmitted to the surface through the cable.

In order to dimension the string of casings in respect of strength, it is necessary to know the actual deformation and stress condition of the casing pipes. The described solutions do not allow this, since they determine only the pressures acting on the casing pipes instead of the stresses.

The solution according to the invention—with the use of suitable measuring apparatus—is aimed at elimination of the deficiencies of the known measuring systems. Thus, the purpose of the invention is to solve the problem of measuring the deformation and mechanical stress condition of the string of casings of drill holes, first of all of those drilled during the exploration of oil fields. For this purpose a system was devised consisting of a measuring distance piece in the depth, a drill hole probe and measurement-recording unit on the surface. This measuring system measures the deformations developing in the casing pipes, while the role of the signal converter is taken up by the extensometer stamps stuck to the external surface of the measuring distance piece.

Values of the mechanical stress are derived from the measured deformations after appropriate conversion.

The invention is described in detail on the basis of the enclosed drawing.

The drawing enclosed to the specification is diagramatic, the structural elements of the apparatus developed according to the invention were marked with reference numbers in order to facilitate comprehension of the operation.

Before the detailed description of the apparatus, the various loads and resultant deformations are compiled in the form of table:

| Loads | | Deformations |
| --- | --- | --- |
| (1) Differential pressure (decisive difference of external and internal pressure) | (1) | Tangential deformation (increase or reduction of outside diameter) |
| (1.1) Temperature difference | | |
| (2) Axial load | (2) | Longitudinal deformation |
| (2.1) tensile load | | |
| (2.2) compressive force | | |

| Loads | Deformations |
|---|---|
| (2.3) spatial bending | |
| (2.4) temperature difference | |

The measuring distance piece 1 built into the apparatus is made of antimagnetic steel. The extensometer stamps serving as the signal converter are stuck to the external surface of the measuring distance piece 1. The measuring distance piece is fitted between two casing pipes 2 with a threaded sleeve joint (which is conventional and hence not shown in the drawing.)

The extensometer stamps are disposed at 90° on the mantle of the measuring distance piece 1, consequently four measuring locations can be formed in one plane. For conversion of the measured deformation to electrical signal and its processing, an electronic unit 7 built up from printed circuits is used, mounted on the external surface of the measuring distance piece 1, and covered by a protective casing 4. The electronic unit 7 is in space 1a, while for insulation of the extensometer stamps and terminals rubber jacket 5 or filler material is used. Power supply of the extensometer stamps 8 stuck onto the measuring distance piece 1 and that of the electronic unit 7 is transmitted by the drill hole probe 6. The drill hole probes 6 are lowered into the string of casings 2 in electrical surveying cables 3 down to the depth of the built-in measuring distance piece. The electric energy supply of the measuring system is ensured with 220 V, 50 Hz current through cable 3 from the surface.

To the effect of the various loads acting on the string of casing 2, the deformation and stress condition developing in the antimagnetic measuring distance piece 1 are in proportion with the loads. By the electric switching of the extensometer stamps which measure the deformations, the possibility is given for the selective, individual measurement of the elongations caused by the particular load effects. The electric energy supply takes place as follows:

alternating current→magnetic flux→alternating voltage→direct voltage

The electric signal (resistance) arriving from the extensometer stamps 8 is transformed to frequency in several steps in the electronic unit 7 and through the antimagnetic measuring distance piece 1, drill hole probe 6 and cable 3 it is transmitted to the measuring and recording unit on the surface. The measuring and recording unit on the surface directly indicates and records the electric frequency in proportion with the measured deformations, but in case of necessity, after the suitable conversion the mechanical deformations, stresses, load effects, etc. can also be measured and recorded.

In view of above, it is apparent that as a result of the various loads, the deformations arising in the antimagnetic measuring distance piece that forms an integral part of the string of casing, are measured with individual selective measurement by the apparatus through the extensometer stamps mounted as a signal converter and provided with protective rubber in such a way that the casing pipe stresses and other stresses can be determined with recalculation from the measured data.

The electronic unit 7 is a conventional switch arrangement built up from printed circuits. Similarly conventional is the measuring and recording unit on the surface. The electronic unit 7 built up from printed circuits is connected in conventional way with the transformer 8' performing the current transformation.

What we claim is:

1. An apparatus for the in situ measurement of the deformation and stress conditions of a string of casings in a drilled oil well, comprising: an antimagnetic measuring section mountable in a string of casings at a selected depth and having a mantle, extensometers fixed on the mantle and a first electronic unit including printed circuits mounted on the measuring section and receptive of the outputs of the extensometers for transforming amplitude variations to frequency variations and for transmitting the frequency signal; and a drill hole probe extendable into the interior of the string of casings to the depth of the measuring section and having an electrical cable fixed thereto and having a sufficient length to reach the surface when the probe is at the desired depth, means for transmitting energy from the cable to the first electronic unit to energize same to transmit the frequency signal and a second electronic unit receptive of the transmission from the first electronic unit for applying the frequency signal to the cable for processing at the surface.

2. The apparatus according to claim 1, further comprising a rubber jacket surrounding the extensometers and a protective casing surrounding the first electronic unit.

* * * * *